(12) United States Patent
Dellock et al.

(10) Patent No.: US 10,081,295 B2
(45) Date of Patent: Sep. 25, 2018

(54) ILLUMINATED BADGE FOR A VEHICLE

(71) Applicant: Ford Global Technologies, LLC, Dearborn, MI (US)

(72) Inventors: Paul Kenneth Dellock, Northville, MI (US); Michael A. Musleh, Canton, MI (US); Stuart C. Salter, White Lake, MI (US); Brian Siler, Richmond, MI (US); Harry Lobo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 14/881,489

(22) Filed: Oct. 13, 2015

(65) Prior Publication Data

US 2017/0101047 A1    Apr. 13, 2017

(51) Int. Cl.
| | |
|---|---|
| *B60Q 1/00* | (2006.01) |
| *B60Q 1/26* | (2006.01) |
| *B60R 13/00* | (2006.01) |
| *G09F 21/04* | (2006.01) |
| *G09F 13/22* | (2006.01) |
| *F21S 43/00* | (2018.01) |
| *F21V 23/00* | (2015.01) |
| *F21K 9/64* | (2016.01) |
| *F21Y 101/00* | (2016.01) |

(52) U.S. Cl.
CPC ......... *B60Q 1/2619* (2013.01); *B60Q 1/2603* (2013.01); *B60R 13/005* (2013.01); *F21K 9/64* (2016.08); *F21S 43/00* (2018.01); *F21V 23/003* (2013.01); *G09F 13/22* (2013.01); *G09F 21/04* (2013.01); *B60Q 2400/10* (2013.01); *B60Q 2400/40* (2013.01); *F21Y 2101/00* (2013.01)

(58) Field of Classification Search
CPC .......... B60Q 1/2619; F21K 9/56; F21S 48/00; F21V 23/003; F21Y 2101/02
See application file for complete search history.

(56) References Cited

U.S. PATENT DOCUMENTS

| | | | | |
|---|---|---|---|---|
| 4,457,089 A | * | 7/1984 | Phillips, Jr. .............. | B60Q 1/30 40/204 |
| 5,105,179 A | * | 4/1992 | Smith ...................... | B60Q 1/56 340/461 |
| 6,101,748 A | * | 8/2000 | Cass ....................... | G09F 13/12 40/219 |
| 6,698,118 B2 | * | 3/2004 | Tietze ..................... | B60R 13/10 40/204 |

(Continued)

FOREIGN PATENT DOCUMENTS

| | | |
|---|---|---|
| CN | 201169230 Y | 2/2009 |
| CN | 201193011 Y | 2/2009 |

(Continued)

*Primary Examiner* — Mary Ellen Bowman
(74) *Attorney, Agent, or Firm* — Jason Rogers; Price Heneveld LLP

(57) ABSTRACT

A badge is provided herein. The badge includes a housing having an integrally formed first layer and second layer. A light source is disposed within the badge. A first photoluminescent structure is disposed between the light source and housing. The first photoluminescent structure is configured to emit outputted light in response to inputted light emitted from the light source. The outputted light exits the housing through a light transmissive portion. A substrate is attached to the housing.

15 Claims, 12 Drawing Sheets

(56) References Cited

U.S. PATENT DOCUMENTS

| | | | |
|---|---|---|---|
| 6,729,738 B2 | 5/2004 | Fuwausa et al. | |
| 6,773,129 B2* | 8/2004 | Anderson, Jr. | H01H 9/18 362/394 |
| 6,871,986 B2* | 3/2005 | Yamanaka | B60Q 3/68 362/490 |
| 6,990,922 B2 | 1/2006 | Ichikawa et al. | |
| 7,213,923 B2 | 5/2007 | Liu et al. | |
| 7,264,366 B2 | 9/2007 | Hulse | |
| 7,264,367 B2 | 9/2007 | Hulse | |
| 7,575,349 B2* | 8/2009 | Bucher | B60Q 1/302 362/231 |
| 7,753,541 B2* | 7/2010 | Chen | B60Q 1/2607 362/498 |
| 7,834,548 B2 | 11/2010 | Jousse et al. | |
| 7,932,534 B2* | 4/2011 | Singh | H01L 33/007 257/98 |
| 8,016,465 B2 | 9/2011 | Egerer et al. | |
| 8,203,260 B2 | 6/2012 | Li et al. | |
| 8,408,766 B2 | 4/2013 | Wilson et al. | |
| 8,466,438 B2 | 6/2013 | Lambert et al. | |
| 8,519,362 B2 | 8/2013 | Labrot et al. | |
| 8,606,430 B2 | 12/2013 | Seder et al. | |
| 8,724,054 B2 | 5/2014 | Jones | |
| 8,773,012 B2 | 7/2014 | Ryu et al. | |
| 9,343,003 B2* | 5/2016 | Podd | G09F 9/33 |
| 2003/0179548 A1 | 9/2003 | Becker et al. | |
| 2004/0213088 A1 | 10/2004 | Fuwausa | |
| 2006/0087826 A1* | 4/2006 | Anderson, Jr. | B60K 35/00 362/23.01 |
| 2009/0219730 A1 | 9/2009 | Syfert et al. | |
| 2012/0001406 A1 | 1/2012 | Paxton et al. | |
| 2013/0335994 A1* | 12/2013 | Mulder | F21V 9/00 362/555 |
| 2014/0266666 A1 | 9/2014 | Habibi | |
| 2015/0314725 A1* | 11/2015 | Salter | H05B 37/0218 362/510 |

FOREIGN PATENT DOCUMENTS

| | | |
|---|---|---|
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| WO | 2006047306 A1 | 5/2006 |
| WO | 2014068440 A1 | 5/2014 |

* cited by examiner

US 10,081,295 B2

ILLUMINATED BADGE FOR A VEHICLE

FIELD OF THE INVENTION

The present disclosure generally relates to vehicle lighting systems, and more particularly, to an illuminated badge employing one or more light sources therein.

BACKGROUND OF THE INVENTION

Illumination arising from the use of a plurality of light sources offers a unique and attractive viewing experience. It is therefore desired to implement such structures in automotive vehicles for various lighting applications.

SUMMARY OF THE INVENTION

According to one aspect of the present disclosure, a badge is disclosed. The badge includes a housing having an integrally formed first layer and second layer. A light source is also disposed within the badge. A first photoluminescent structure is disposed between the light source and housing. The first photoluminescent structure is configured to emit an outputted light in response to an inputted light emitted from the light source. The outputted light exits the housing through a light transmissive portion. A substrate is attached to the housing.

According to another aspect of the present disclosure, a badge for a vehicle is disclosed. The badge includes a substrate having a light-producing assembly thereon. A housing is attached to the substrate and has a viewable portion. A photoluminescent structure is disposed over a portion of the light-producing assembly. The photoluminescent structure is configured to luminesce in response to excitation by the light-producing assembly. The light emitted from the light-producing assembly exits the housing through a first light transmissive portion.

According to yet another aspect of the present disclosure, a method of forming a badge is disclosed. The method includes forming a housing by molding a first, light transmissive layer and over molding a second, substantially opaque layer onto the first layer, wherein the second layer at least partially covers the first layer. A light source and photoluminescent structure is placed below the second layer, wherein the photoluminescent structure is configured to emit outputted light in response to inputted light emitted from the light source through a light transmissive portion. A substrate is attached to the housing to encapsulate the light source and photoluminescent structure between the housing and substrate.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 2:
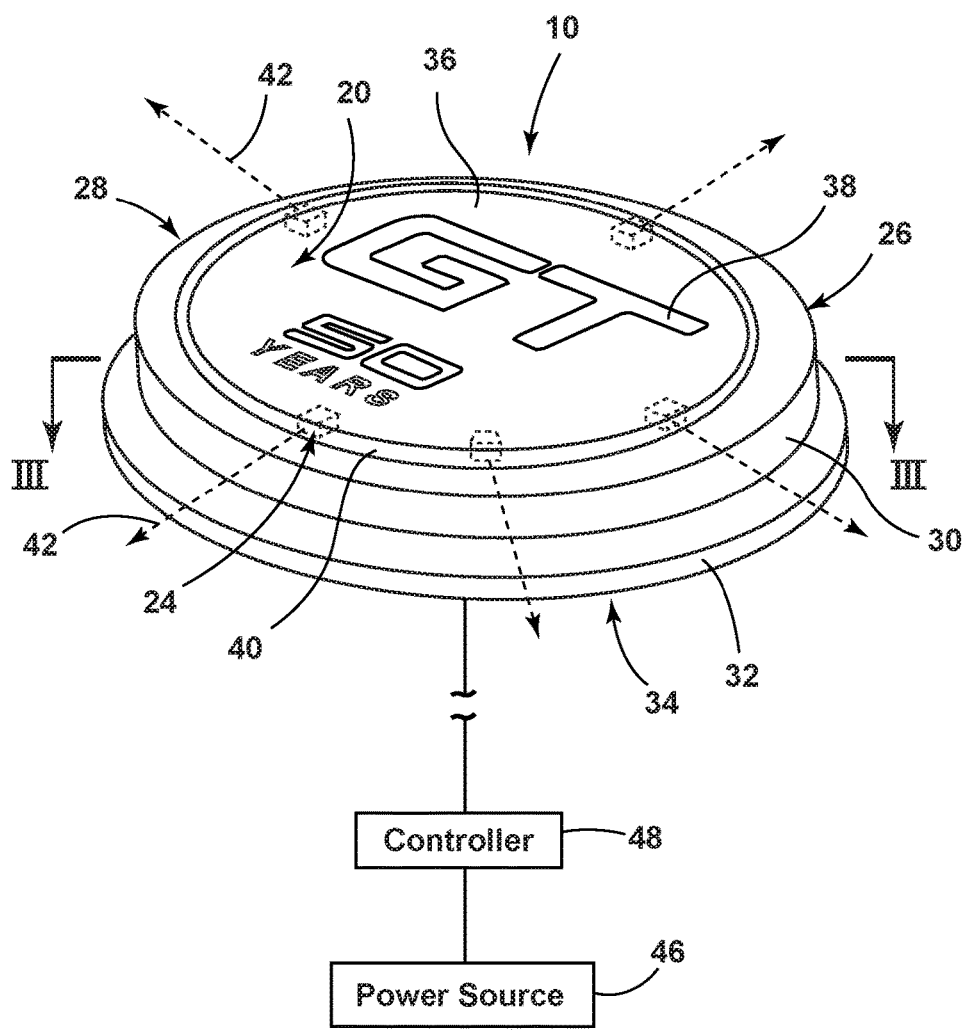
FIG. 2 is a perspective view of the badge, according to one embodiment.

For purposes of description herein, the terms "upper," "lower," "right," "left," "rear," "front," "vertical," "horizontal," and derivatives thereof shall relate to the disclosure as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

The following disclosure describes an illuminated badge for a vehicle. The badge may advantageously employ one or more light sources configured to illuminate at pre-defined frequencies. The lighting system may advantageously employ one or more photoluminescent structures to illuminate in response to pre-defined events. The one or more photoluminescent structures may be configured to convert light received from an associated light source and re-emit the light at a different wavelength typically found in the visible spectrum. In some embodiments, the light source may implement a thin design, thereby helping to fit the light source into small package spaces of the vehicle where traditional light sources may not be practicable. The illuminated badge may have portions thereof integrally formed through a multi-step injection molding process.

Figure 1:
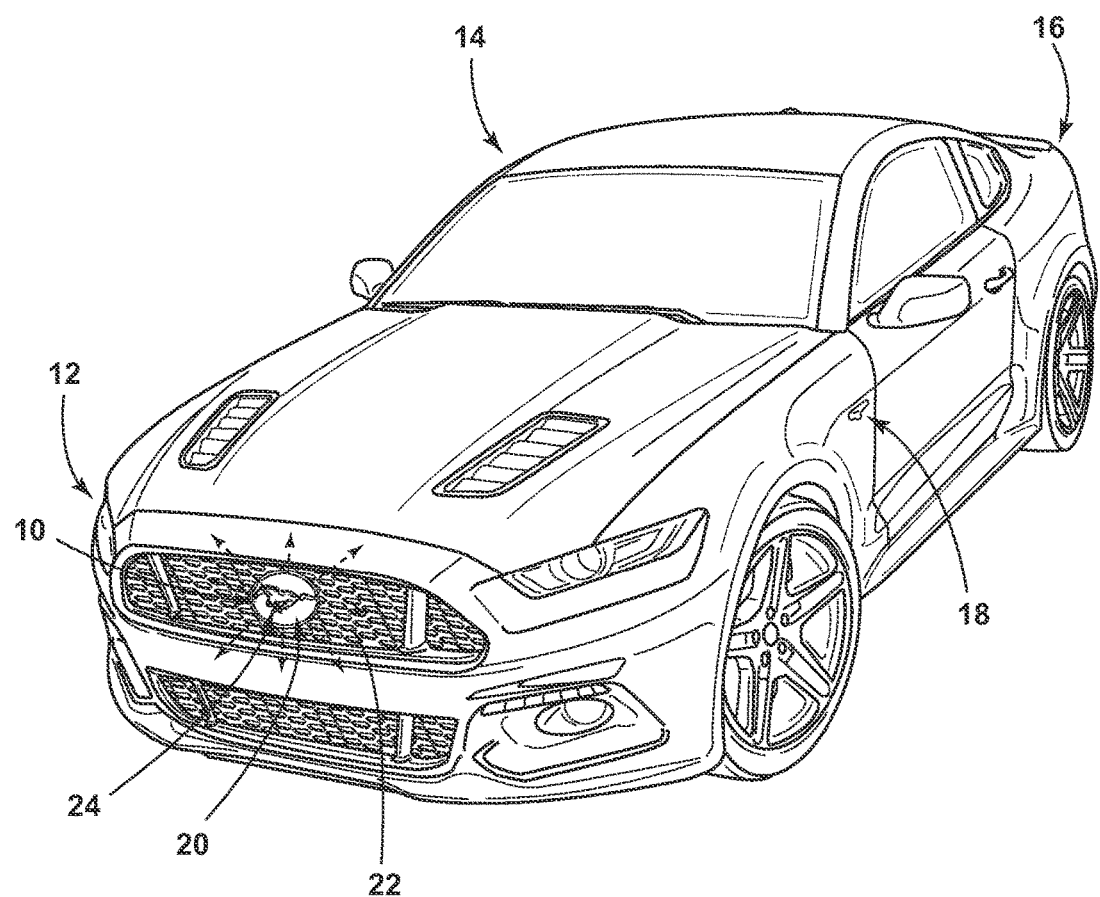
FIG. 1 illustrates a badge, according to one embodiment, mounted to a front portion of a vehicle.

Referring to FIG. 1, an illuminated badge 10 is generally shown mounted on a front end 12 of a vehicle 14. In other embodiments, the badge 10 may be located elsewhere, such as, but not limited to, a rear end 16 or side(s) 18 of the vehicle 14. The badge 10 may be configured as an insignia that may be presented as an identifying mark of a vehicle make, manufacturer, and/or desired information and includes a viewable portion 20 that is generally prominently displayed on the vehicle 14. In the presently illustrated embodiment, the badge 10 is centrally located on a grille assembly 22, thus allowing the badge 10 to be readily viewed by an observer looking head on at the vehicle 14. As will be described below in greater detail one or more light sources 24 within the badge 10 may illuminate to provide a distinct styling element to the vehicle 14.

Referring to FIG. 2, the badge 10 is exemplarily shown, according to one embodiment, having a housing 26 that includes the viewable portion 20 centrally located on a forward portion 28 thereof and a peripheral portion 30. The badge 10 may also include a substrate 32 that may be attached to the housing 26. The substrate 32 may form a rear portion 34 of the badge 10. The substrate 32, or rear portion 34, may be capable of being secured to a vehicle 14. A cavity may be disposed between the housing 26 and substrate 32. The cavity may be hollow, may include additional components therein, and/or may be wholly filled in when the housing 26 and substrate 32 are attached to one another. Each portion of the housing 26 and substrate 32 may be made of any practicable material, such as a polymeric material. The viewable portion 20 may include a background region 36, indicia 38, and/or a perimeter portion 40. The indicia 38 may signify the make, model, or any other information that may be desirable to confer about the vehicle 14 upon which the badge 10 is attached to. The perimeter portion 40 may further confer a design on the badge 10, such as a metallic ring that encompasses the indicia 38.

According to one embodiment, the perimeter portion 40 may be light transmissive such that the light source 24 may emit inputted and/or outputted light 42, 44 through the perimeter portion 40. However, in alternate embodiments, inputted and/or outputted light 42, 44 emitted from within the badge 10 may escape through any portion of the badge 10 without departing from the teachings provided herein. For example, according to an alternate embodiment, the indicia 38 disposed on the badge 10 may be light transmissive. The badge 10 may also include a photoluminescent structure 72 (FIG. 8) in and/or on a portion thereof. The photoluminescent structure 72 contains at least one photoluminescent material 98 (FIG. 8), as will be described in greater detail below. The photoluminescent material 98 is configured to convert inputted light 42 emitted from the light source 24 at a first wavelength to an outputted light 44 of a second wavelength. According to one embodiment, the first and second wavelengths vary in length.

Accordingly, a light source 24 is disposed rearwardly of and orientated towards the viewable portion 20. The light source 24 may include any form of light source. For example, fluorescent lighting, light emitting diodes (LEDs), organic LEDs (OLEDs), polymer LEDs (PLEDs), solid state lighting, or any other form of lighting configured to emit light may be utilized. The light source 24 may be powered by a vehicle power source 46 or any other power source disposed onboard the vehicle 14. Moreover, a controller 48 may be configured to control the illumination of the light source 24. The controller 48 may be an independent controller 48 responsible for controlling the badge 10, or alternatively, may be configured to control a plurality of functions within the vehicle 14.

A variable current may be supplied to the light source 24 to adjust the degree of illumination emitted therefrom. For example, the current may vary from 1 to 5 times greater than the steady state current. Moreover, any light source 24 disposed within the badge 10 may illuminate in a plurality of colors and/or hues based on the wavelength emitted from the light source 24 and/or the intensity of light emitted therefrom.

Figure 3:
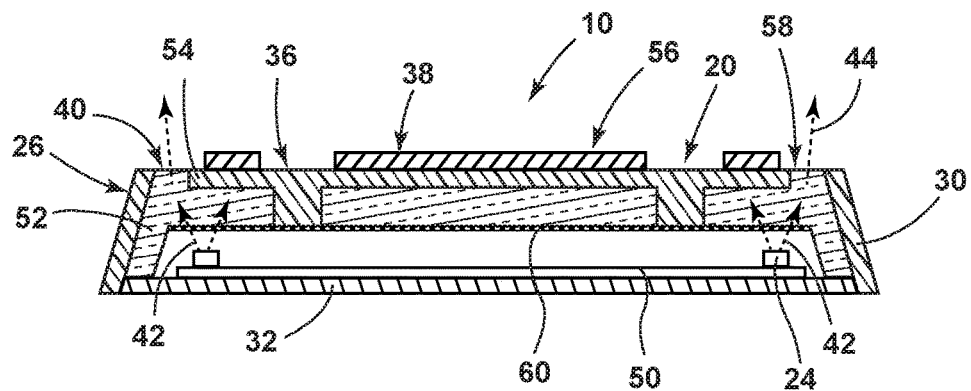
FIG. 3 is a cross-sectional view of the badge taken along lines III-III of FIG. 2 illustrating a two-component housing disposed above a light source, according to one embodiment.
Figure 4:
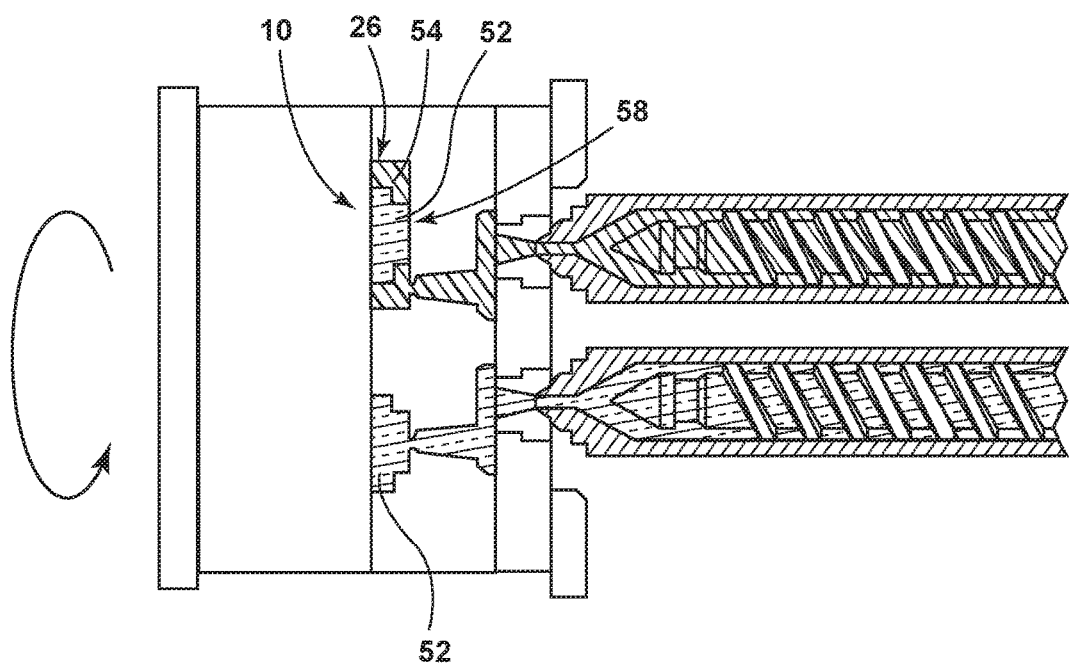
FIG. 4 illustrates an exemplary injection molding process that may be utilized in forming the housing of the badge during manufacturing.

Referring to FIGS. 3-4, a cross-sectional view of the badge 10 taken along the line III-III of FIG. 2 is shown illustrating one embodiment of the badge 10. The badge 10 includes a housing 26 coupled to a substrate 32. The badge 10 may further include a printed circuit board (PCB) 50 that is disposed between the substrate 32 and the housing 26. The PCB 50 may be secured to the substrate 32 or the housing 26 at any angle such that a light source 24 disposed on the PCB 50 is positioned towards a desired target location. The PCB 50 may include a white solder mask to reflect light incident thereon.

According to one embodiment, the housing 26 and/or substrate 32 may be constructed from a rigid material such as, but not limited to, a polymeric material and may be assembled together via sonic welding, laser welding, vibration welding, injection molding, or any other process known in the art. Alternatively, the housing 26 and substrate 32 may be assembled together via the utilization of adhesives. Alternatively still, the housing 26 and substrate 32 may be integrally formed as a single component.

As shown in FIG. 3, the housing 26 may be formed from a transparent or translucent first layer 52 and an opaque second layer 54 disposed on a portion thereof, according to one embodiment. The opaque second layer 54 may cover a portion of an A-surface 56 of the badge 10. As used herein, the A-surface 56 may be defined as any surface of the badge 10 that may be visible once the badge 10 is attached to the vehicle 14. The portions of the A-surface 56 that are not covered by the second layer 54 may permit inputted and/or outputted light 42, 44 therethrough thereby creating a light transmissive portion 58 within the badge 10. As shown in FIG. 3, the light transmissive portion 58 of the badge 10 correlates to the perimeter portion 40. Moreover, a reflective layer 60 may be disposed on a portion of the housing 26. Accordingly, the perimeter portion 40 may have a metallic appearance when the light source 24 is in an unilluminated state and emit light therethrough when the light source 24 is in an illuminated state. Accordingly, the reflective layer 60 should be light permeable to allow light to pass therethrough.

Referring to FIG. 4, a wide variety of multi-step injection molding processes may be used for making the badge 10. Due to fabrication and assembly steps being performed inside the molds, molded multi-material objects allow significant reduction in assembly operations and production cycle times. Furthermore, the product quality can be improved, and the possibility of manufacturing defects and total-manufacturing costs can be reduced. In multi-material injection molding, multiple different materials are injected into a multi-stage mold. The sections of the mold that are not to be filled during a molding stage are temporally blocked. After the first injected material sets, then one or more blocked portions of the mold are opened and the next material is injected. This process continues until the required multi-material part is created.

According to one embodiment, a multi-shot molding process is used to form the housing 26 of the badge 10. The first layer 52 is formed through a first injection-molding step and is made from a transparent and/or translucent material. For example, clear acrylic may be utilized. However, polycarbonate, or any transparent and/or translucent materials, may also be used. The transparent and/or translucent material may form the structure of the housing 26 and create the light transmissive portion 58 that allows inputted light 42 emitted from the light source 24 to exit through a desired portion of the badge 10 (e.g., the perimeter portion 40).

The second layer 54 that may be formed from an opaque plastic that is molded over the first layer 52 to substantially prevent inputted light 42 emitted from the light source 24 within the cavity from exiting the housing 26 through the second layer 54 is formed during a second injection-molding step. According to the embodiment of FIG. 4, a two-shot injection molding machine with a rotating platen may be utilized to manufacture the housing 26 described herein. However, it will be appreciated that any other process may be utilized for creating the two layer housing 26. In alternative embodiments, additional components may be added during any of injection steps, or successively added in additional injections thereby adhering more components to the badge 10. For example, indicia 38, or a logo, may be added to the outer surface of the first or second layer 54. Additionally, or alternatively, the substrate 32 may be attached to the housing 26 during a successively molding step.

Figure 5:
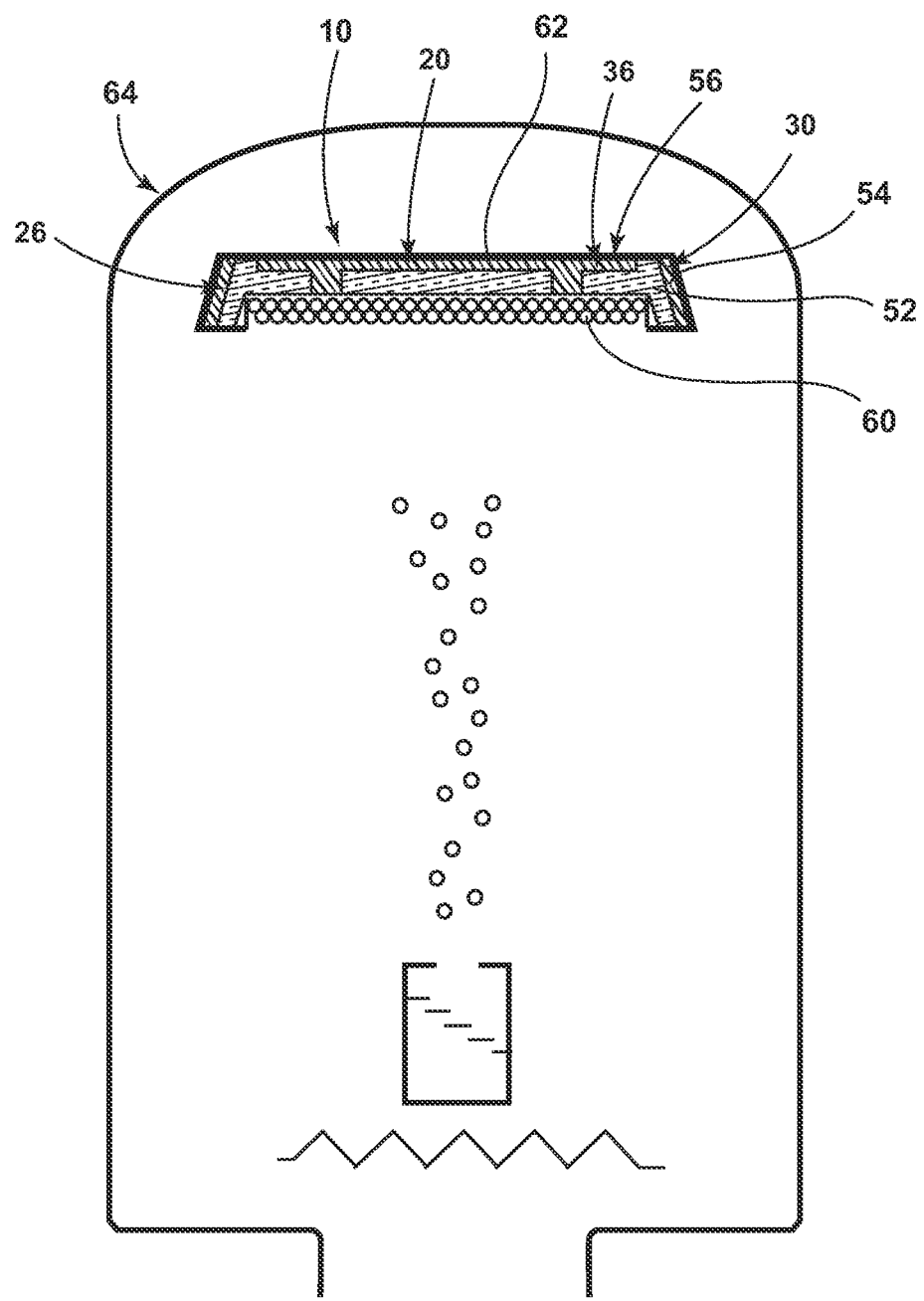
FIG. 5 illustrates the badge disposed within an exemplary vacuum chamber to add a reflective layer to the badge.

Referring to FIG. 5, portions of the housing 26 that are readily visible (e.g., the peripheral portion 30 and viewable portion 20) may be colored any color or may be metalized to give the portions of the badge 10 a metallic appearance. As illustrated in FIG. 5, a reflective layer 60 may be disposed below the first layer 52. According to the illustrated embodiment, the first and second layers 52, 54 of the badge 10 are integrally formed through a multi-step injection molding process. A removable protective component 62 is then applied over the A-surface 56 of the badge 10, such as tape, a masking fixture, or by other means known in the art. The badge 10 is then disposed in a vacuum chamber 64 and a thin layer of a reflective material is applied to the interior surface of the housing 26. Various processes of vacuumed metalizing may be utilized, including but not limited to, physical vapor deposition (PVD), chemical vapor deposition (CVD), low-pressure chemical vapor deposition (LPCVD), plasma-enhanced CVD (PECVD), and plasma-assisted CVD (PACVD). Alternatively, a sputter coating, or any other type of coating known in the art, may also be used without departing from the teachings provided herein.

Any material having a reflective, or chrome-like, appearance may be utilized. For example, aluminum may be utilized for giving any portion of the badge 10 a metallic finish. Alternative materials, such as gold, bronze, brass or any other material may also be used to achieve alternative, desired appearances. The thickness of deposited material may determine the amount of light that will transmit or reflect when the light source 24 is illuminated. According to one embodiment, 20-80% light transmittance is desired. Accordingly, the thickness of material deposited below the first layer 52 may be less than 15 nm, and more particularly between 4 and 12 nm, according to one embodiment. However, it will be appreciated that the optimum light transmittance and/or reflectance will vary based on the desired material.

Similarly, the indicia 38 disposed on the viewable portion 20 may also confer a metallic appearance. According to one embodiment, the indicia 38 may also have a reflective layer 60 disposed thereon that is applied via partial vacuum deposition. It will be appreciated that the background region 36, like any other portion, may be colored any desired color.

According to an alternate embodiment, a reflective layer 60 may be applied to any portion of the housing 26 via electroplating a thin layer of a metallic material, such as chromium thereon. Alternatively still, an imitator of chrome may be used for aesthetic purposes. Alternate processes may be used for coloring or layering material onto a portion of the badge 10, as known in the art without departing from the teachings provided herein.

Figure 6:
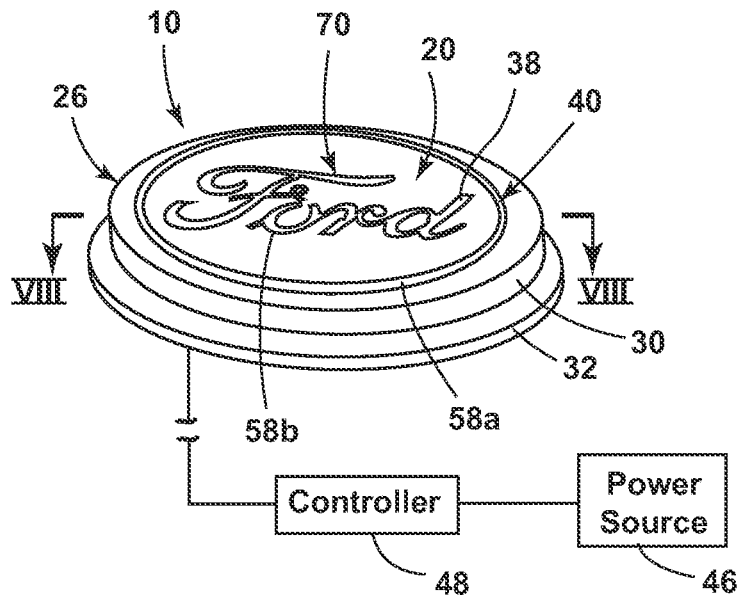
FIG. 6 illustrates a perspective view of the badge having a plurality of light transmissive portions on a viewable portion thereof.
Figure 7:
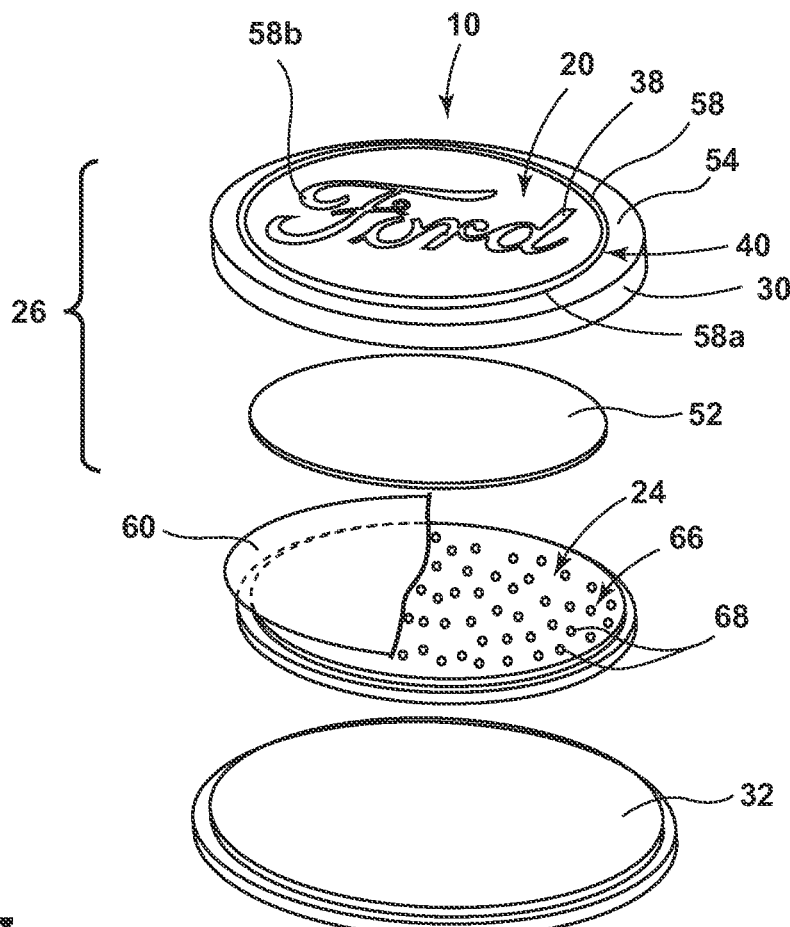
FIG. 7 is an exploded view of the badge having a light-producing assembly therein, according to one embodiment.

Referring to FIGS. 6-7, a badge 10 is shown, according to one embodiment, having a light source 24 that is configured as a light-producing assembly 66 that contains a plurality of micro-sized light-emitting diode (LED) sources 68. The light-producing assembly 66 is disposed on the substrate 32 of the badge 10. As illustrated, the badge 10 includes a reflective layer 60 disposed above the light-producing assembly 66. The first layer 52 is configured as a translucent base that is disposed over the light-producing assembly 66. The first layer 52 may protect and seal the light-producing assembly 66 from the environment, including moisture. As such, the first layer 52 and substrate 32 may be configured to encapsulate the light-producing assembly 66 containing the plurality of LED sources 68.

A second layer 54 is disposed over the first layer 52 and may be formed from an opaque material. The second layer 54 may include voids 70 therein that form light transmissive portions 58. As shown in FIGS. 6-7, a first light transmissive portion 58a correlates to the perimeter portion 40. A second light transmissive portion 58b correlates to the indicia 38.

During operation of the illuminated badge 10, the LED sources 68 can be illuminated by the controller 48 and the power source 46. When activated, the LED sources 68 provide small pixels of light that shine through the chromatic layer, the first layer 52, and the transmissive portions 58a, 58b. When the LED sources 68 within the light-producing assembly 66 are not activated, the transmissive portions 58a, 58b of the badge 10 may exhibit a mirror-like appearance by virtue of the reflective layer 60.

Figure 8:
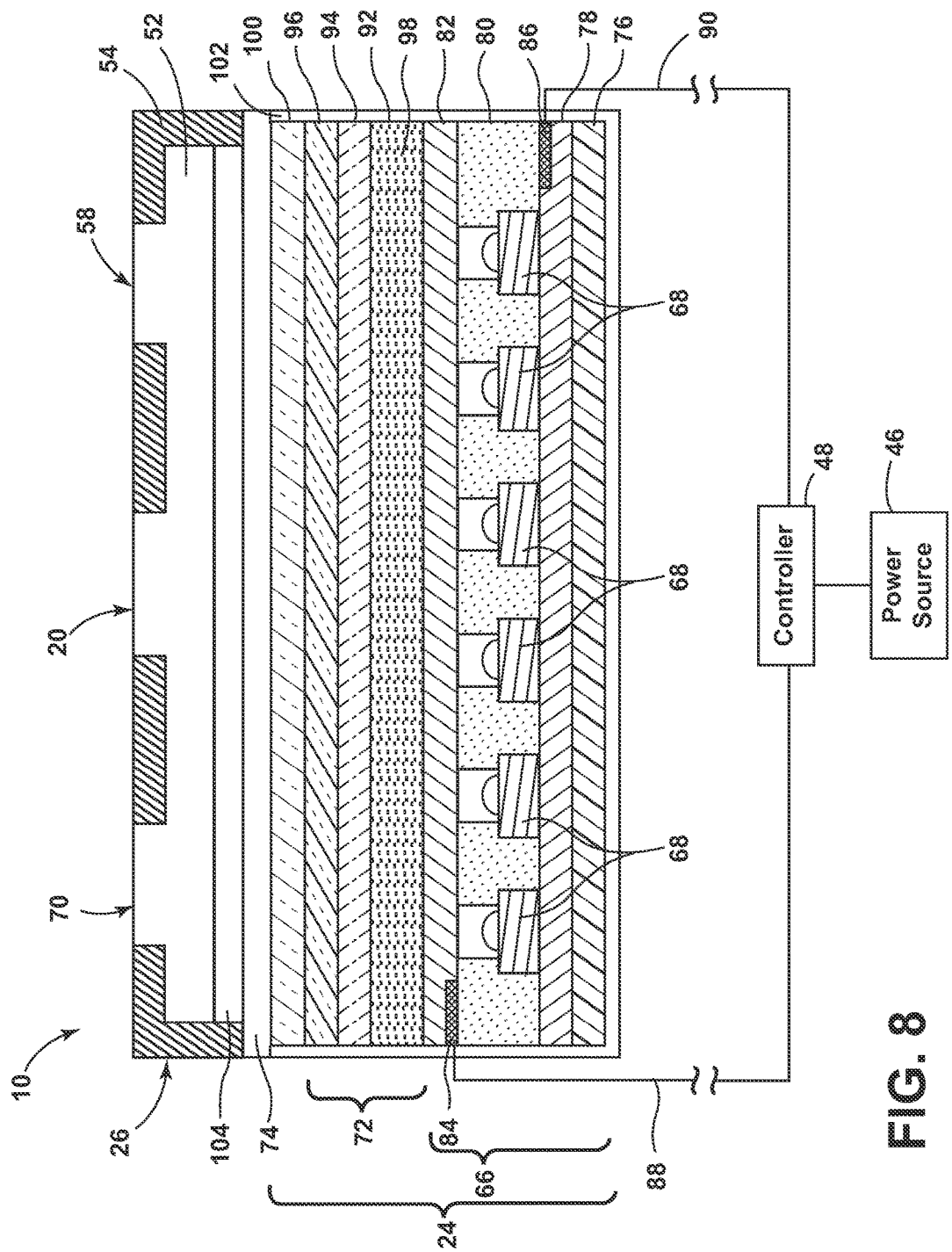
FIG. 8 is a cross-sectional view taken along line VIII-VIII of FIG. 6 illustrating a light source employed in the badge according to one embodiment.
Figure 9:
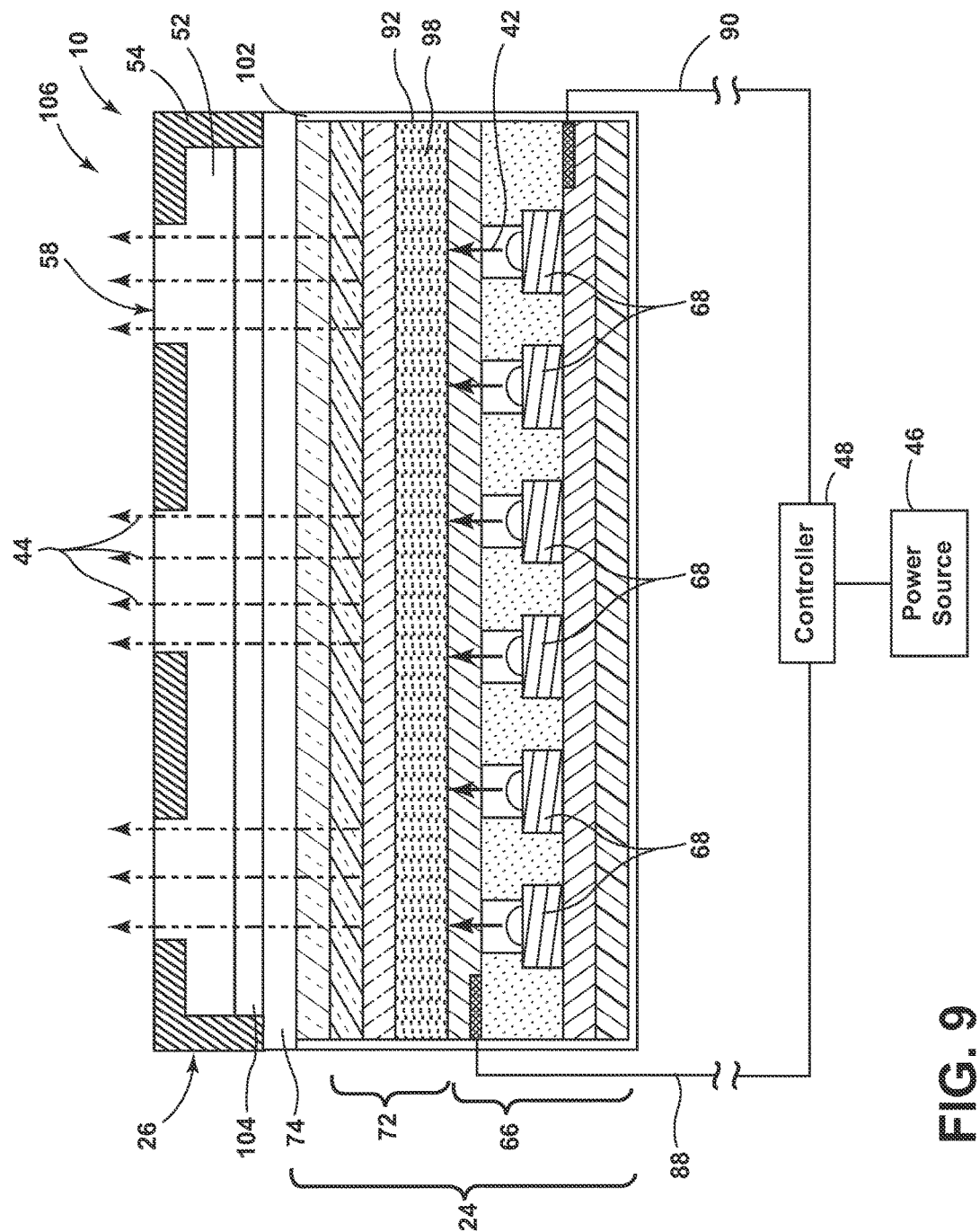
FIG. 9 is a cross-sectional view taken along line VIII-VIII of FIG. 6 further illustrating the light source, according to one embodiment.
Figure 10:
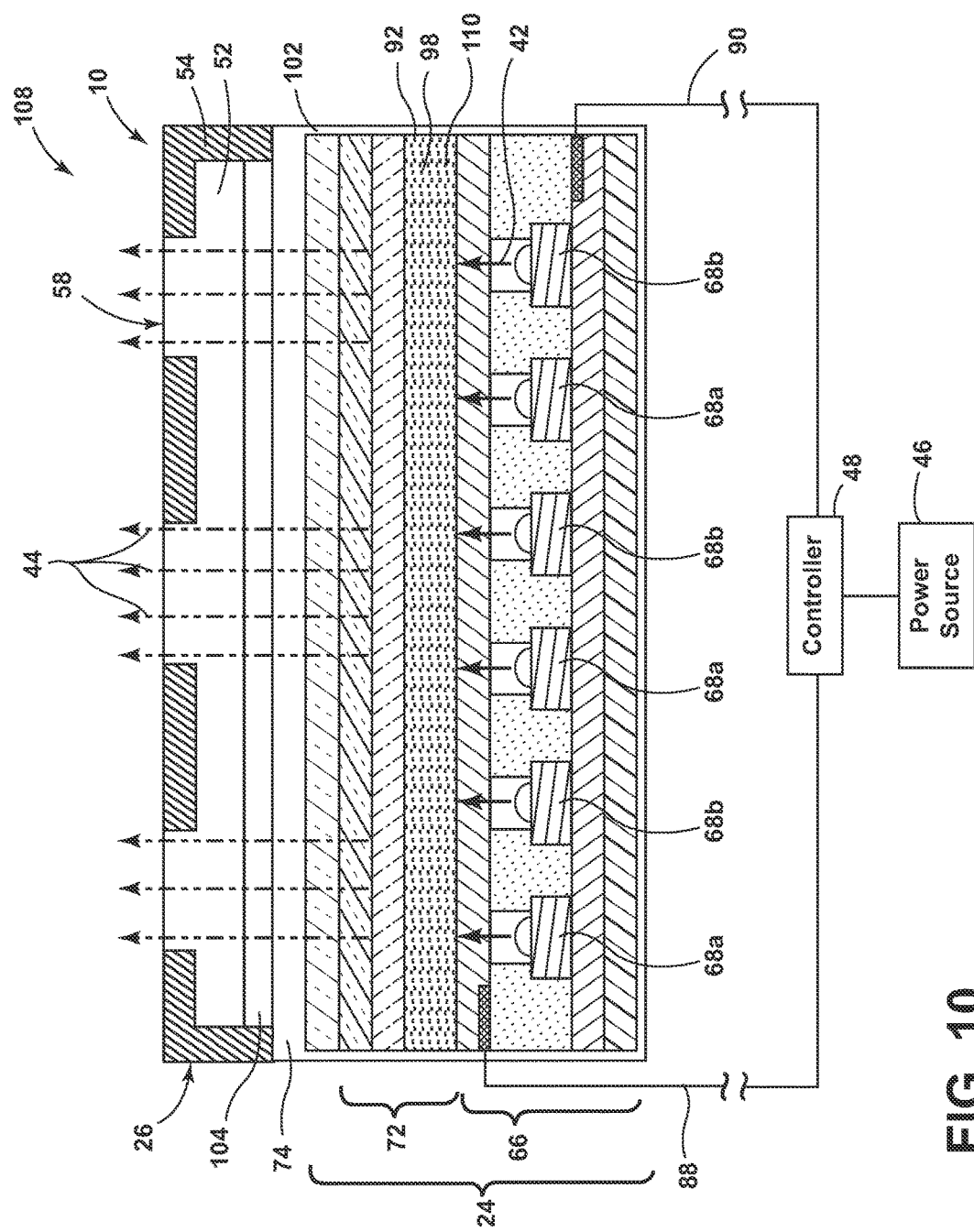
FIG. 10 is a cross-sectional view taken along line VIII-VIII of FIG. 6 illustrating an alternate light source, according to one embodiment.

Referring to FIGS. 8-10, a cross-sectional view of the light source 24 having a photoluminescent structure 72 thereon is shown, according to one embodiment. As illustrated in FIG. 8, the light source 24 may have a stacked arrangement that includes a light-producing assembly 66, a photoluminescent structure 72, an adhesive layer 74, and the housing 26.

The light-producing assembly 66 may correspond to a thin-film or printed light emitting diode (LED) assembly and includes a base member 76 as its lowermost layer. The base member 76 may include a polycarbonate, poly-methyl methacrylate (PMMA), or polyethylene terephthalate (PET) material, or any other material known in the art, which may be on the order of 0.005 to 0.060 inches thick and is arranged over the intended vehicle surface on which the light source 24 is to be received (e.g., the substrate 32) according to one embodiment.

The light-producing assembly 66 includes a positive electrode 78 arranged over the base member 76. The positive electrode 78 includes a conductive epoxy such as, but not limited to, a silver-containing or copper-containing epoxy. The positive electrode 78 is electrically connected to at least a portion of a plurality of LED sources 68 arranged within a semiconductor ink 80 and applied over the positive electrode 78. Likewise, a negative electrode 82 is also electrically connected to at least a portion of the LED sources 68. The negative electrode 82 is arranged over the semiconductor ink 80 and includes a transparent or translucent conductive material such as, but not limited to, indium tin oxide. Additionally, each of the positive and negative electrodes 78, 82 are electrically connected to a controller 48 and a power source 46 via a corresponding bus bar 84, 86 and conductive leads 88, 90. The bus bars 84, 86 may be printed along opposite edges of the positive and negative electrodes 78, 82 and the points of connection between the bus bars 84, 86 and the conductive leads 88, 90 may be at opposite corners of each bus bar 84, 86 to promote uniform current distribution along the bus bars 84, 86. It will be appreciated that in alternate embodiments, the orientation of components within the light-producing assembly 66 may be altered without departing from the concepts of the present disclosure. For example, the negative electrode 82 may be disposed below the semiconductor ink 80 and the positive electrode 78 may be arranged over the aforementioned semiconductor ink 80. Likewise, additional components, such as the bus bars 84, 86 may also be placed in any orientation such that the light-producing assembly 66 may emit inputted light 42 (FIG. 9) towards a desired location.

The LED sources 68 may be dispersed in a random or controlled fashion within the semiconductor ink 80 and may be configured to emit focused or non-focused light toward the photoluminescent structure 72. The LED sources 68 may correspond to micro-LEDs of gallium nitride elements on the order of about 5 to about 400 microns in width and the semiconductor ink 80 may include various binders and dielectric material including, but not limited to, one or more of gallium, indium, silicon carbide, phosphorous, and/or translucent polymeric binders or any combination thereof.

The semiconductor ink 80 can be applied through various printing processes, including ink jet and silk screen processes to selected portion(s) of the positive electrode 78. More specifically, it is envisioned that the LED sources 68 are dispersed within the semiconductor ink 80, and shaped and sized such that a substantial quantity of the LED sources 68 align with the positive and negative electrodes 78, 82 during deposition of the semiconductor ink 80. The portion of the LED sources 68 that ultimately are electrically connected to the positive and negative electrodes 78, 82 may be illuminated by a combination of the bus bars 84, 86, controller 48, power source 46, and conductive leads 88, 90. According to one embodiment, the power source 46 may correspond to a vehicular power source 46 operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 8, the photoluminescent structure 72 is arranged over the negative electrode 82 as a coating, layer, film, or other suitable deposition. With respect to the presently illustrated embodiment, the photoluminescent structure 72 may be arranged as a multi-layered structure including an energy conversion layer 92, optional stability layer 94, and optional protection layer 96.

The energy conversion layer 92 includes at least one photoluminescent material 98 having energy converting elements with phosphorescent or fluorescent properties. For example, the photoluminescent material 98 may include organic or inorganic fluorescent dyes including rylenes, xanthenes, porphyrins, and phthalocyanines or any combination thereof. Additionally, or alternatively, the photoluminescent material 98 may include phosphors from the group of Ce-doped garnets such as YAG:Ce. The energy conversion layer 92 may be prepared by dispersing the photoluminescent material 98 in a polymer matrix to form a homogenous mixture using a variety of methods. Such methods may include preparing the energy conversion layer 92 from a formulation in a liquid carrier medium and coating the energy conversion layer 92 to the negative electrode 82 or other desired base member 76. The energy conversion layer 92 may be applied to the negative electrode 82 by painting, screen printing, flexography, spraying, slot coating, dip coating, roller coating, bar coating, and/or any other methods known in the art. Alternatively, the energy conversion layer 92 may be prepared by methods that do not use a liquid carrier medium. For example, the energy conversion layer 92 may be rendered by dispersing the photoluminescent material 98 into a solid state solution (homogenous mixture in a dry state) that may be incorporated in a polymer matrix formed by extrusion, injection seal, compression seal, calendaring, thermoforming, etc.

To protect the photoluminescent material 98 contained within the energy conversion layer 92 from photolytic and thermal degradation, the photoluminescent structure 72 may include the stability layer 94. The stability layer 94 may be configured as a separate layer optically coupled and adhered to the energy conversion layer 92 or otherwise integrated therewith. The photoluminescent structure 72 may also include the protection layer 96 optically coupled and adhered to the stability layer 94 or other layer (e.g., the energy conversion layer 92 in the absence of the stability layer 94) to protect the photoluminescent structure 72 from physical and chemical damage arising from environmental exposure. The stability layer 94 and/or the protection layer 96 may be combined with the energy conversion layer 92 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 98 is formulated to become excited upon receiving inputted light 42 (FIG. 9) of a specific wavelength from at least a portion of the LED sources 68 of the light-producing assembly 66. As a result, the inputted light 42 undergoes an energy conversion process and is re-emitted at a different wavelength.

According to one embodiment, the photoluminescent material 98 may be formulated to convert inputted light 42 into a longer wavelength light, otherwise known as down conversion. Alternatively, the photoluminescent material 98 may be formulated to convert inputted light 42 into a shorter wavelength light, otherwise known as up conversion. Under either approach, light converted by the photoluminescent material 98 may be immediately emitted as outputted light 44 (FIG. 9) from the photoluminescent structure 72 or otherwise used in an energy cascade, wherein the converted light serves as inputted light to excite another formulation of photoluminescent material 98 located within the energy conversion layer 92, whereby the subsequent converted light may then be outputted from the photoluminescent structure 72 or used as inputted light, and so on. With respect to the energy conversion processes described herein, the difference in wavelength between the inputted light 42 and the converted outputted light 44 is known as the Stokes shift and serves as the principle driving mechanism for an energy conversion process corresponding to a change in wavelength of light.

With continued reference to FIG. 8, an insulative layer 100 may be disposed between an adhesive layer 74 and the photoluminescent structure 72. The insulative layer 100 may include a polymeric material or other suitable material and is configured to be light transmissive such that inputted and/or outputted light 42, 44 may be emitted therethrough. According to one embodiment, the insulative layer 100 may include a second photoluminescent structure having at least one photoluminescent material 98 therein or thereon.

An overmold material 102 may be disposed around the light-producing assembly 66 and photoluminescent structure 72 and may be formed integrally with the insulative layer 100. The overmold material 102 may protect the light-producing assembly 66 from a physical and chemical damage arising from environmental exposure. The overmold material 102 may have viscoelasticity (i.e., having both viscosity and elasticity), a low Young's modulus, and/or a high failure strain compared with other materials so that the overmold material 102 may protect the light-producing assembly 66 when contact is made thereto.

The adhesive layer 74 is disposed above the photoluminescent material 98 and/or the insulative layer 100. The adhesive layer 74 may be configured as any type of light transmissive adhesive, such as any optically clear adhesive (OCA) known in the art. The adhesive may be selected to provide desired properties suitable for application within the badge 10. For example, the adhesive layer 74 can include a material chosen from polymeric, acrylic based, and/or non-acrylic based materials. Alternatively, the adhesive layer 74 can include rubber based adhesives. The rubber based adhesive can be a natural or synthetic rubber material. For example, the rubber based pressure-sensitive adhesive can comprise natural and/or synthetic elastomeric polymers based on synthetic or natural rubber, such as natural rubber (polyisoprene), polybutadiene, synthetic polyisoprene, random styrene-butadiene (SB) polymers, SB block copolymers, multi-armed and/or repeating SB copolymers or any combination thereof. According to an alternate embodiment, two-sided transparent and/or transparent tape may be utilized.

Still referring to FIG. 8, a reflective layer 60 may be adhered to the adhesive layer 74. The reflective layer 60 may be made of any practicable material, such as a polymer and may be light transmissive. According to one embodiment, a reflective layer 60 is disposed rearwardly of the viewable portion 20 that reflects at least 20% and preferably 20-80% of inputted and/or outputted light 42, 44 emitted from the light-producing assembly 66. The reflective layer 60 may help to conceal the components of the light-producing assembly 66 disposed below the reflective layer 60 that otherwise might be seen through the light transmissive portions 58 of the badge 10. It will be appreciated, however, that the badge 10 need include a reflective layer 60, and other components of the badge 10 may be utilized to substantially conceal components within the badge 10.

As described above, a transparent and/or translucent first layer 52 forms a base portion of the housing 26 and is disposed above the reflective layer 60. Similarly, a second, substantially opaque layer is disposed above portions of the first layer 52 that prevents inputted and/or outputted light 42, 44 from exiting the badge 10 therethrough. As discussed above, the first and second layers 52, 54 may be integrally formed through a multi-step injection molding process. Likewise, the reflective layer 60 may also be disposed on the desired portions of the first and second layers 52, 54 within the injection mold tool simultaneously, or through consecutive injection molding steps.

In some embodiments, the photoluminescent structure 72 may be employed separate and away from the light-producing assembly 66. For example, the photoluminescent structure 72 may be positioned on a vehicle 14, the grille assembly 22, and/or a surface proximate thereto, but preferably not in physical contact with the light-producing assembly 66. It will be understood that in embodiments where the photoluminescent structure 72 is incorporated into distinct components separated from the light source 24, the light source 24 may still have the same or similar structure to the light source 24 described in reference to FIG. 8.

Referring to FIG. 9, an energy conversion process 106 for producing single color luminescence is illustrated according to one embodiment. For purposes of illustration, the energy conversion process 106 is described below using the light source 24 depicted in FIG. 8. In this embodiment, the energy conversion layer 92 of the photoluminescent structure 72 includes a single photoluminescent material 98, which is configured to convert inputted light 42 received from LED sources 68 into an outputted light 44 having a wavelength different than that associated with the inputted light 42. More specifically, the photoluminescent material 98 is formulated to have an absorption spectrum that includes the emission wavelength of the inputted light 42 supplied from the LED sources 68. The photoluminescent material 98 is also formulated to have a Stokes shift resulting in the converted visible outputted light 44 having an emission spectrum expressed in a desired color, which may vary per lighting application. The converted visible outputted light 44 is emitted from the light source 24 via the light transmissive portions 58 of the badge 10, thereby causing the light transmissive portions 58 to illuminate in the desired color. In one embodiment, the energy conversion process 106 is undertaken by way of down conversion, whereby the inputted light 42 includes light on the lower end of the visibility spectrum such as blue, violet, or ultraviolet (UV) light. Doing so enables blue, violet, or UV LEDs to be used as the LED sources 68, which may offer a relative cost advantage over simply using LEDs of the desired color and foregoing the energy conversion, process altogether. Furthermore, the illumination provided by the light transmissive portions 58 may offer a unique, substantially uniform, and/or attractive viewing experience that may be difficult to duplicate through non-photoluminescent means.

Referring to FIG. 10, a second energy conversion process 108 for generating multiple colors of light is illustrated according to one embodiment. For consistency, the second energy conversion process 108 is also described below using the light source 24 depicted in FIG. 8. In this embodiment, the energy conversion layer 92 includes the first and second photoluminescent materials 98, 110 that are interspersed within the energy conversion layer 92. Alternatively, the photoluminescent materials 98, 110 may be isolated from each other if desired. Also, it will be appreciated that the energy conversion layer 92 may include more than two different photoluminescent materials 98, 110, in which case, the concepts provided herein similarly apply. In one embodiment, the second energy conversion process 108 occurs by way of down conversion using blue, violet, and/or UV light as the source of excitation.

With respect to the presently illustrated embodiment, the excitation of photoluminescent materials 98, 110 is mutually exclusive. That is, photoluminescent materials 98, 110 are formulated to have non-overlapping absorption spectrums and Stokes shift that yield different emission spectrums. Also, in formulating the photoluminescent materials 98, 110, care should be taken in choosing the associated Stokes shift such that the converted outputted light 44 emitted from one of the photoluminescent materials 98, 110, does not excite the other, unless so desired. According to one exemplary embodiment, a first portion of the LED sources 68, exemplarily shown as LED sources 68a, is configured to emit an inputted light 42 having an emission wavelength that only excites photoluminescent material 98 and results in the inputted light 42 being converted into a visible light outputted 44 of a first color (e.g., white). Likewise, a second portion of the LED sources 68, exemplarily shown as LED sources 68b, is configured to emit an inputted light 42 having an emission wavelength that only excites second photoluminescent material 110 and results in the inputted light 42 being converted into a visible outputted light 44 of a second color (e.g., red). Preferably, the first and second colors are visually distinguishable from one another. In this manner, LED sources 68a and 68b may be selectively activated using the controller 48 to cause the photoluminescent structure 72 to luminesce in a variety of colors. For example, the controller 48 may activate only LED sources 68a to exclusively excite photoluminescent material 98, resulting in the light transmissive portions 58 illuminating in the first color. Alternatively, the controller 48 may activate only LED sources 68b to exclusively excite the second photoluminescent material 110, resulting in the light transmissive portions 58 illuminating in the second color which may be different than the first color.

Alternatively still, the controller 48 may activate LED sources 68a and 68b in concert, which causes both of the photoluminescent materials 98, 110 to become excited, resulting in the light transmissive portions 58 illuminating in a third color, which is a color mixture of the first and second color (e.g., pinkish) and thus is a different color than the first and second color. The intensities of the inputted light 42 emitted from each LED sources 68a, 68b may also be proportionally varied to one another such that additional colors may be obtained. For energy conversion layers 92 containing more than two distinct photoluminescent materials 98, 110, a greater diversity of colors may be achieved. Contemplated colors include red, green, blue, and combinations thereof, including white, all of which may be achieved by selecting the appropriate photoluminescent materials and correctly manipulating their corresponding LED sources 68.

Figure 11:
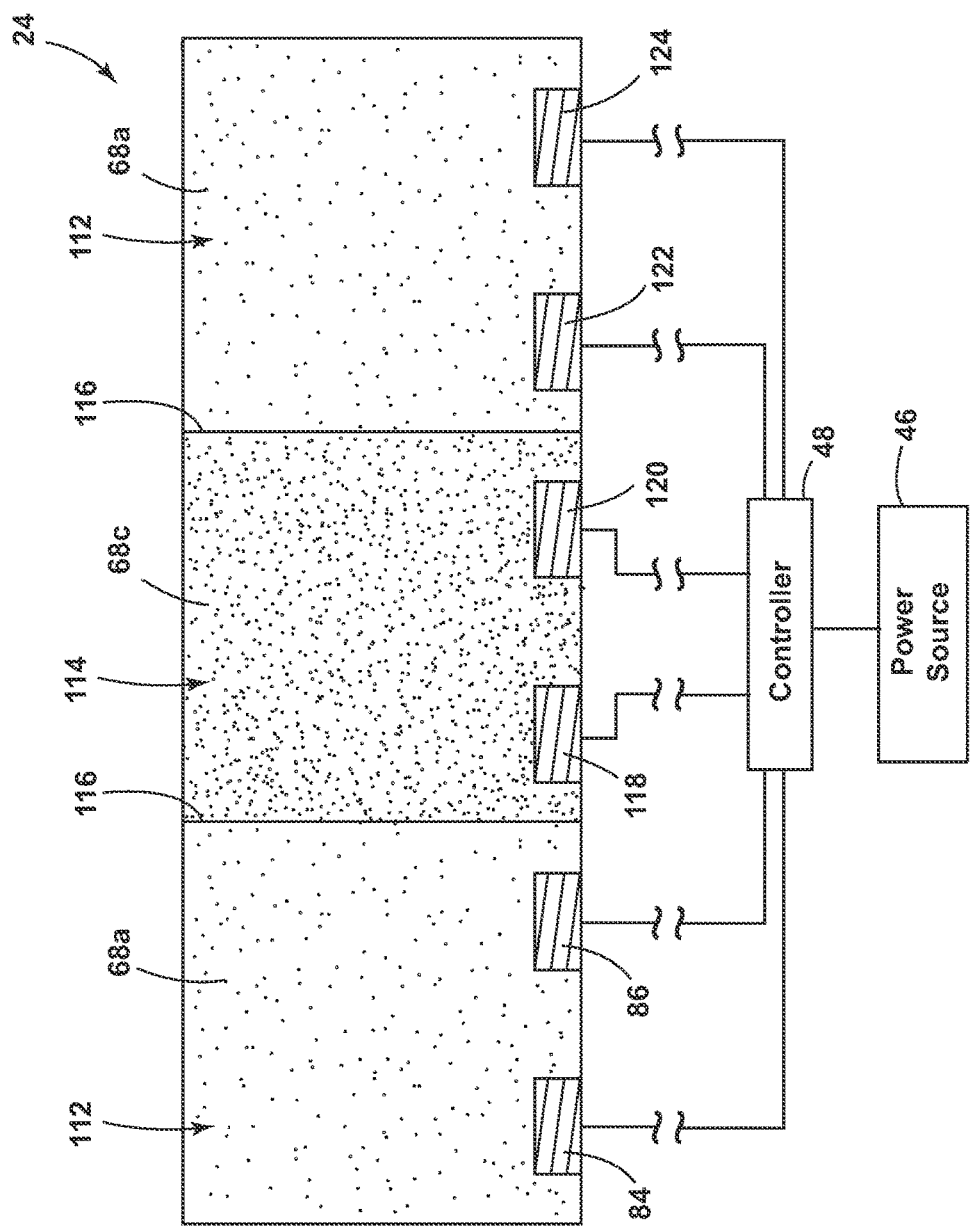
FIG. 11 is a top view of a light-producing assembly, according to one embodiment, having varying types and concentrations of LED sources transversely along the light-producing assembly.

Referring to FIG. 11, a light-producing assembly 66, according to one embodiment, is illustrated from a top view having varying types and concentrations of LED sources 68a, 68c transversely along the light-producing assembly 66. As illustrated, a first portion 112 of the light-producing assembly 66 includes LED sources 68a that are configured to emit an inputted light 42 having an emission wavelength in a first color (e.g., white) spectrum. Likewise, a second portion 114 of the light-producing assembly 66 includes LED sources 68c that are configured to emit an inputted light 42 having an emission wavelength in a second color (e.g., red) spectrum. The first and second portions 112, 114 of the light-producing assembly 66 may be separated by insulative, or non-conductive, barriers 116 from proximately disposed portions through any means known in the art such that each portion 112, 114 may be illuminated independently of any other portion 112, 114. Further, each portion 112, 114 disposed within the light-producing assembly 66 may include a respective bus bar 84, 86, 118, 120, 122, 124 coupled to the controller 48 and configured to illuminate each respective portion 112, 114. It will be appreciated that the bus bars 84, 86, 118, 120, 122, 124 may be coupled to each portion 112, 114 of the light-producing assembly 66 on opposing sides in alternate embodiments, as described above.

According to one embodiment, the first and second colors are visually distinguishable from one another. In this manner, LED sources 68a and 68c may be selectively activated using the controller 48 to cause the LED sources 68a, 68c to illuminate in a variety of colors. For example, the controller 48 may activate only LED sources 68a to exclusively illuminate a portion 112 of the light-producing assembly 66 in the first color. Alternatively, the controller 48 may activate only LED sources 68c to exclusively illuminate a portion 114 of the light-producing assembly 66 in the second color. It will be appreciated that the light-producing assembly 66 may include any number of portions 112, 114 having varying LED sources 68a, 68c that may illuminate in any desired color. Moreover, it should also be appreciated that the portions having varying LED sources 68a, 68c may be orientated in any practicable manner and need not be disposed adjacently.

The semiconductor ink 80 may also contain various concentrations of LED sources 68a, 68c such that the density of the LED sources 68a, 68c, or number of LED sources 68a, 68c per unit area, may be adjusted for various lighting applications. In some embodiments, the density of LED sources 68a, 68c may vary across the length of the light source 24. For example, a central portion 114 of the light-producing assembly 66 may have a greater density of LED sources 68 than peripheral portions 112, or vice versa. In such embodiments, the light source 24 may appear brighter or have a greater luminance in order to preferentially illuminate pre-defined locations. In other embodiments, the density of LED sources 68a, 68c may increase or decrease with increasing distance from a preselected point.

Figure 12A:
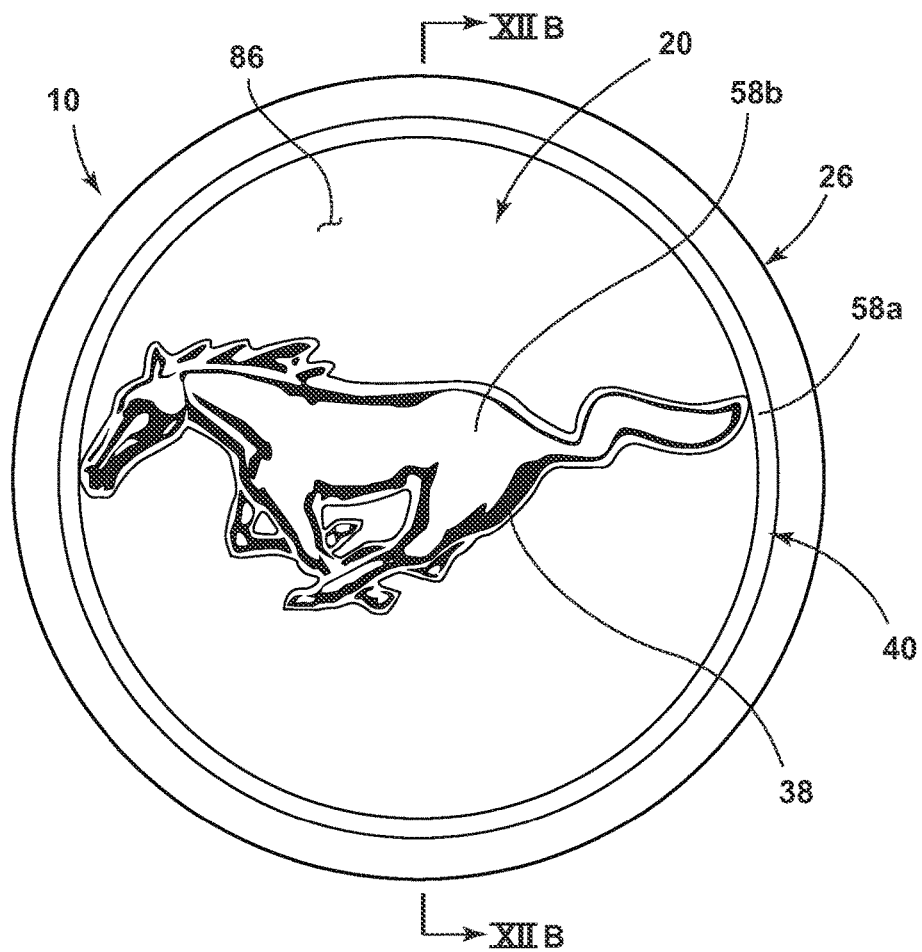
FIG. 12A is a front view of the badge having indicia thereon.
Figure 12B:
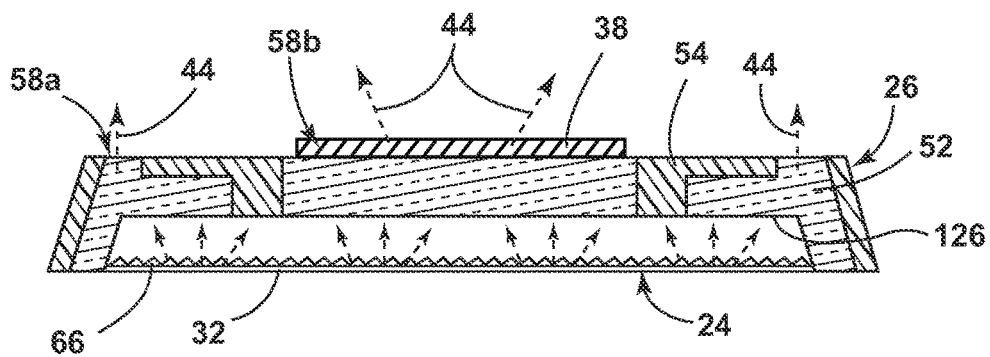
FIG. 12B is an exemplary cross section taken along the line XIIB-XIIB of FIG. 12A.

Referring to FIGS. 12A-12B, the badge 10, according to one embodiment, is illustrated. As shown in FIG. 12A, the badge 10 includes a first, circular light transmissive portion 58a and a second light transmissive portion 58b that is in the form of centrally disposed indicia 38. Referring to FIG. 12B, a cross-sectional view of the badge 10 taken along the line XIIB-XIIB of FIG. 12A is illustrated, according to one embodiment. As illustrated in FIG. 12B, the first layer 52 of the housing 26 forms a base layer of the badge 10. A second layer 54 is disposed over a portion of the first layer 52. The second layer 54 may extend between the A-surface 56 and B-surface of the housing 26 (i.e., unseen surfaces when the badge 10 is attached to the vehicle 14) in some embodiments. The first light transmissive portion 58a is disposed on an outer portion of the viewable portion 20 of the badge 10. The second light transmissive portion 58b is centrally located. Indicia 38 may be disposed above the second light transmissive portion 58b. The indicia 38 may be light transmissive such that the indicia 38 may illuminate independently, or simultaneously, with the first light transmissive portion 58a. For example, as discussed in regards to FIG. 11, the first light transmissive portion 58a may illuminate when LED sources 68a are illuminated. The second light transmissive portion 58b may illuminate when LED sources 68c are illuminated.

In operation, each plurality of LED sources 68a, 68c (FIG. 11) may be activated using a variety of means. For example, the badge 10 may include a user interface 130 (FIG. 14) on the badge 10 and/or within the vehicle 14. The user interface 130 may be configured such that a user may control the wavelength of inputted light 42 that is emitted from each plurality of LED sources 68a, 68c. Alternatively, the user interface 130 may be used to switch the badge 10 through a plurality of modes and/or functions. The user interface 130 may use any type of control known in the art for controlling the plurality of LED sources 68a, 68c, such as, but not limited to, switches (e.g., proximity sensors, push-type buttons) and may be disposed in any practicable location. Additionally, or alternatively, the light source 24 may be automatically activated via an onboard vehicle system such as the vehicle security system and/or other vehicle system. For instance, illumination may occur as part of a welcome or farewell sequence, meaning that the illumination may occur as an occupant of the vehicle 14 leaves and/or approaches the vehicle 14 employing the badge 10. It is contemplated that the badge 10 may have a wide range of target locations such that the badge 10 may be used for a plurality of functions.

According to one embodiment, the plurality of first LED sources 68a may illuminate in a first color and the plurality of second LED sources 68c may illuminate in a second color. Since lighting conditions may vary depending on a plurality of factors including, but not limited to, the current time, date, and weather conditions, the controller 48 may adjust the intensity of any LED source 68a such that illumination of the badge 10 may be noticed under any condition. For example, the light intensity in Florida during a clear summer afternoon will generally be higher than the light intensity in Michigan during an overcast summer morning. Thus, by making this type of information known to the controller 48, the controller 48 can adjust any light source 24 accordingly.

The controller 48 may modify the intensity of the light emitted from any light source 24 by pulse-width modulation or current control. In some embodiments, the controller 48 may be configured to adjust a color of the emitted light by sending control signals to adjust an intensity or energy output level of any of the LED sources 68. By adjusting the range of intensities that may be output from any LED source 68, the LED sources 68 within the badge 10 may confer any desired effect through the viewable portion 20 in combination with the light transmissive portions 58. Moreover, varying the range of intensities of the LED sources 68 may accentuate any appearance features of the badge 10.

In alternate embodiments, a light diffuser may be molded, or alternatively mounted, within the badge 10. The diffuser can be transparent or translucent and generally functions to diffuse the light from the LED sources 68 so that hot spots and shadows are eliminated. The inner surface and/or outer surface of the viewable portion 20 may be coated, roughened or receive micro-faceting to aid in the light diffusion performance.

Figure 13:
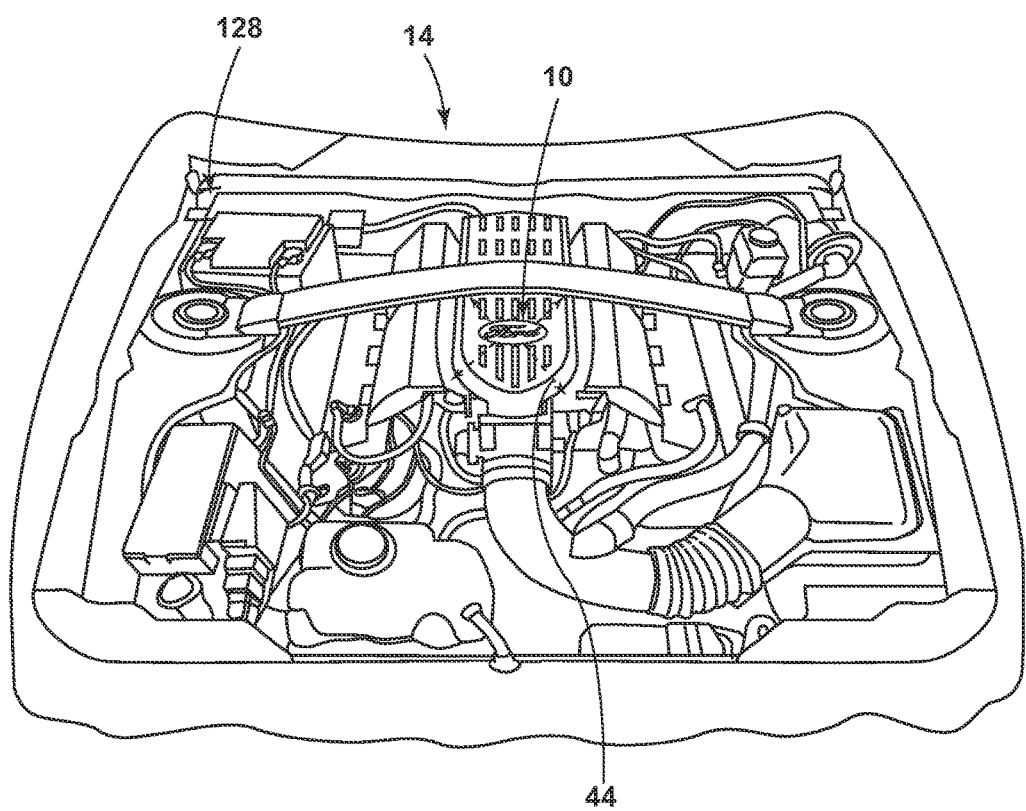
FIG. 13 is a perspective view of a vehicle engine compartment having the badge disposed therein.

Referring now to FIG. 13, an engine compartment 128 of vehicle 14 is generally illustrated with its hood removed for clarity. Various illuminated badges 10 may be mounted to an engine, or any other component, within the engine compartment 128. It should be appreciated that the badge 10 may be configured in any of a myriad of shapes and designs for use within engine compartment 128, or in other interior locations within the vehicle 14. Under ambient lighting conditions, the badge 10 exhibits a chrome-like or mirrored appearance under the hood of the vehicle 14 within the engine compartment 128. More specifically, a chromatic layer (and its shape, design and/or surface appearance) within the badge 10 can be viewed under ambient light conditions. Under low light or nighttime conditions, the badge 10 is illuminated and the exterior surfaces thereof may appear with a uniform glow.

Figure 14:
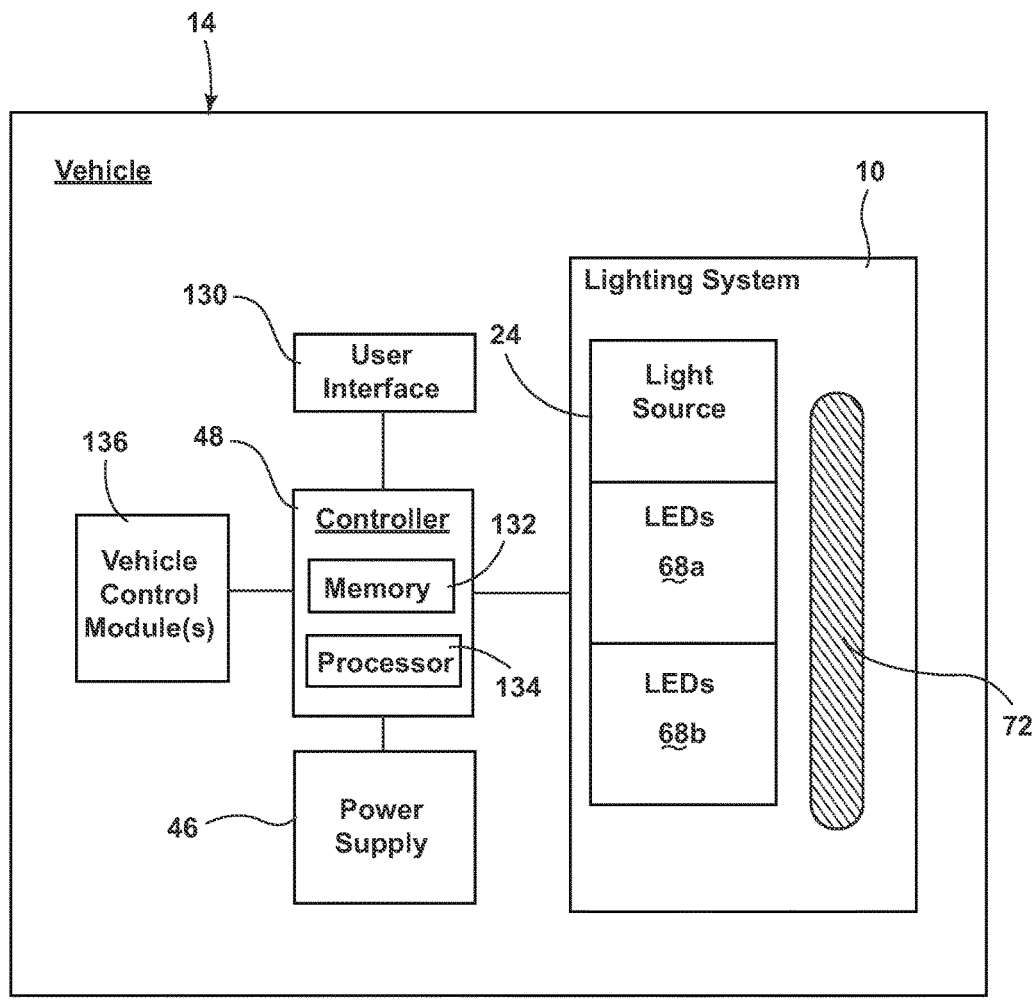
FIG. 14 is a block diagram of the vehicle and the badge.

Referring to FIG. 14, a block diagram of a vehicle 14 is generally shown in which the illuminated badge 10 is implemented. The illuminated badge 10 includes a controller 48 in communication with the light source 24. The controller 48 may include memory 132 having instructions contained therein that are executed by a processor 134 of the controller 48. The controller 48 may provide electrical power to the light source 24, or to a respective bus bar 84, 86, via a power source 46 located onboard the vehicle 14. In addition, the controller 48 may be configured to control the inputted light 42 emitted from each light source 24 based on feedback received from one or more vehicle control modules 136 such as, but not limited to, a body control module, engine control module, steering control module, brake control module, the like, or a combination thereof. By controlling the inputted light 42 emitted from the light source 24, the illuminated badge 10 may illuminate in a variety of colors and/or patterns to provide an aesthetic appearance, or may provide vehicle information to an intended observer. For example, when the illuminated badge 10 is illuminated, the illuminated badge 10 may notify an occupant of the vehicle 14 about a specific condition of the vehicle 14.

In operation, the photoluminescent structure 72 may exhibit periodic unicolor or multicolor illumination. For example, the controller 48 may prompt the light source 24 to periodically emit only the first wavelength of inputted light 42 via the LED sources 68a to cause the photoluminescent structure 72 to periodically illuminate in the first color. Alternatively, the controller 48 may prompt the light source 24 to periodically emit only the second wavelength of inputted light 42 via LED sources 68b to cause the photoluminescent portion to periodically illuminate in the second color. Alternatively, the controller 48 may prompt the light source 24 to simultaneously and periodically emit the first and second wavelengths of inputted light 42 to cause the photoluminescent structure 72 to periodically illuminate in a third color defined by an additive light mixture of the first and second colors. Alternatively still, the controller 48 may prompt the light source 24 to alternate between periodically emitting the first and second wavelengths of inputted light 42 to cause the photoluminescent structure 72 to periodically illuminate by alternating between the first and second colors. The controller 48 may prompt the light source 24 to periodically emit the first and/or second wavelengths of inputted light 42 at a regular time interval and/or an irregular time interval.

In another embodiment, the illuminated badge 10 may include a user interface 130. The user interface 130 may be configured such that a user may control the wavelength of inputted light 42 that is emitted by the LED sources 68 and/or the LED sources 68 that are illuminated. Such a configuration may allow a user to control when the badge 10 is illuminated (e.g., ambient light, warning indicator, welcome/farewell sequence, etc.).

With respect to the above examples, the controller 48 may modify the intensity of the emitted first and second wavelengths of inputted light 42 by pulse-width modulation or current control. In some embodiments, the controller 48 may be configured to adjust a color of the emitted light by sending control signals to adjust an intensity or energy output level of the light source 24. For example, if the light source 24 is configured to output the first emission at a low level, substantially all of the first emission may be converted to the second emission. In this configuration, a color of light corresponding to the second emission may correspond to the color of the emitted light from the illuminated badge 10. If the light source 24 is configured to output the first emission at a high level, only a portion of the first emission may be converted to the second emission. In this configuration, a color of light corresponding to a mixture of the first emission and the second emission may be output as the emitted light. In this way, each of the controllers 48 may control an output color of the emitted light.

Though a low level and a high level of intensity are discussed in reference to the first emission of inputted light 42, it shall be understood that the intensity of the first emission of inputted light 42 may be varied among a variety of intensity levels to adjust a hue of the color corresponding to the emitted light from the illuminated badge 10. The variance in intensity may be manually altered, or automatically varied by the controller 48 based on pre-defined conditions. According to one embodiment, a first intensity may be output from the illuminated badge 10 when a light sensor senses daylight conditions. A second intensity may be output from the illuminated badge 10 when the light sensor determines the vehicle 14 is operating in a low light environment.

As described herein, the color of the outputted light 44 may be significantly dependent on the particular photoluminescent materials 98 utilized in the photoluminescent structure 72. Additionally, a conversion capacity of the photoluminescent structure 72 may be significantly dependent on a concentration of the photoluminescent material 98 utilized in the photoluminescent structure 72. By adjusting the range of intensities that may be output from the light source 24, the concentration, types, and proportions of the photoluminescent materials 98 in the photoluminescent structure 72 discussed herein may be operable to generate a range of color hues of the emitted light by blending the first emission with the second emission.

Accordingly, an illuminating badge for a vehicle has been advantageously described herein. The badge provides various benefits including an efficient and cost-effective means to produce illumination that may function as a distinct styling element that increases the refinement of a vehicle, or any other product that may have a badge disposed thereon.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A badge, comprising:
a housing including an integrally formed first layer disposed within a peripheral portion of a second layer, wherein the second layer also includes a central portion, the first layer visible from an A-surface between the peripheral portion and the central portion of the second layer;
a first photoluminescent structure disposed between a light source and the housing and configured to emit an outputted light in response to an inputted light emitted from the light source, wherein the outputted light exits the housing through a light transmissive portion; and
indicia disposed forwardly of the first and second layers.

2. The badge of claim 1, wherein the light transmissive portion is disposed on a viewable portion of the housing.

3. The badge of claim 2, wherein the light source comprises a plurality of printed LEDs.

4. The badge of claim 1, wherein the first photoluminescent structure comprises at least one photoluminescent material configured to down convert an inputted light received from at least a portion of the light source into a visible light that is outputted to a viewable portion.

5. The badge of claim 4, wherein the inputted light comprises one of blue light, violet light, and UV light.

6. The badge of claim 3, wherein the first layer is formed from a translucent material and the second layer is formed from a substantially opaque material.

7. The badge of claim 2, wherein the light transmissive portion is configured as a geometric shape that substantially encompasses the indicia.

8. A method of forming a badge, comprising:
forming a housing by molding a first, light transmissive layer and over-molding a second, opaque layer onto the first layer, wherein the second layer partially covers the first layer on a first side and extends rearwardly of the first layer on a second side; and placing and encapsulating a light source and a photoluminescent structure between the housing and a substrate.

9. The method of forming a badge of claim 8, further comprising:

attaching indicia to a viewable portion.

10. The method of forming a badge of claim 9, further comprising:

coupling a controller to the light source, wherein the controller is configured to illuminate the light source thereby illuminating a portion of the viewable portion.

11. The method of forming a badge of claim 10, wherein the indicia is light transmissive and the light source is configured to emit light towards the viewable portion.

12. The method of forming a badge of claim 8, wherein the first photoluminescent structure comprises at least one photoluminescent material configured to down convert an inputted light received from at least a portion of the light source into a visible light that is outputted to a viewable portion.

13. The method of forming a badge of claim 12, wherein the inputted light comprises one of blue light, violet light, and UV light.

14. The method of forming a badge of claim 8, wherein the light source is configured as a first portion of printed LEDs configured to emit light through a first light transmissive portion and a second portion of printed LEDs configured to illuminate through a second light transmissive portion.

15. A method of forming a badge, comprising:

forming a housing by molding a first, light transmissive layer and over-molding a second, opaque layer onto the first layer, wherein the second layer partially covers the first layer on a first side and extends rearwardly of the first layer on a second side;

placing and encapsulating a light source and a photoluminescent structure between the housing and a substrate; and attaching indicia to a viewable portion.

* * * * *